No. 690,409.  
E. S. DOWNS.  
CARBONOMETER.  
(Application filed Dec. 24, 1900.)
Patented Jan. 7, 1902.
(No Model.)
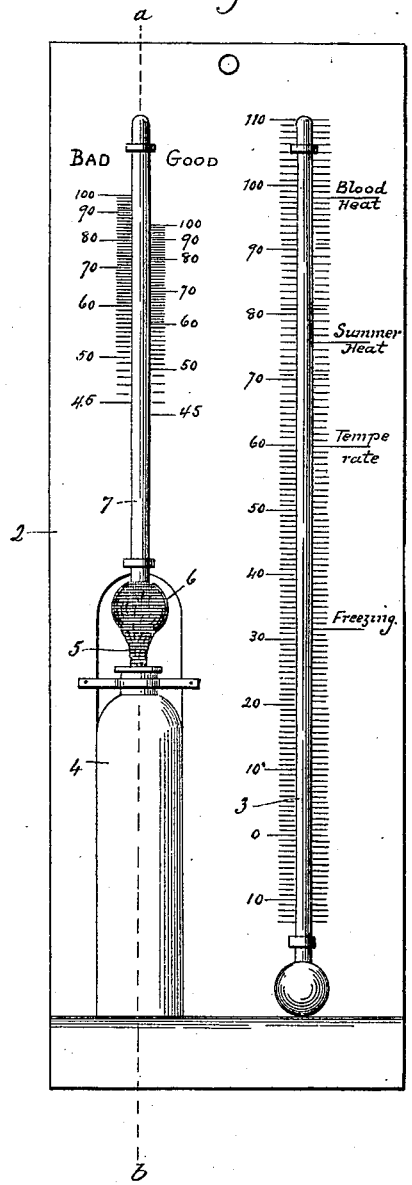
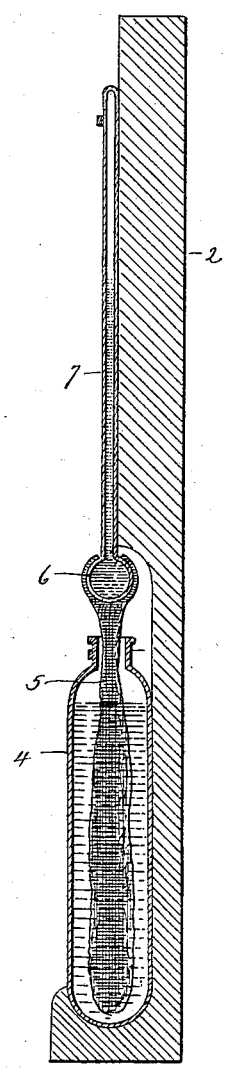

UNITED STATES PATENT OFFICE.

EDGAR S. DOWNS, OF NEW HAVEN, CONNECTICUT, ASSIGNOR OF ONE-HALF TO CLARENCE S. McLEAN, OF ROCHESTER, NEW YORK.

CARBONOMETER.

SPECIFICATION forming part of Letters Patent No. 690,409, dated January 7, 1902.

Application filed December 24, 1900. Serial No. 40,890. (No model.)

*To all whom it may concern:*

Be it known that I, EDGAR S. DOWNS, of New Haven, in the county of New Haven and State of Connecticut, have invented a new Improvement in Carbonometers; and I do hereby declare the following, when taken in connection with the accompanying drawings and the numerals of reference marked thereon, to be a full, clear, and exact description of the same, and which said drawings constitute part of this specification, and represent, in—

Figure 1, a view in front elevation of one form which a carbonometer constructed in accordance with my invention may assume, and Fig. 2 a view thereof in vertical section on the line $a\,b$ of Fig. 1.

My invention relates to an improved device for indicating the amount of carbon dioxid present in the air of any artificially-heated closed room at any time, the object being to provide a guide for the ventilation of school, lecture, and other rooms into the air of which a number of people are breathing not only water-vapor, but also carbon dioxid, by which the air is poisoned and rendered unfit for breathing.

The fact has now been well established by experiment and observation that the air expelled from the lungs in exhalation contains practically fixed proportions of carbon dioxid and water-vapor, with which latter it is filled to the point of saturation. Taking advantage of this observed fact I have constructed a device which indicates the relative amount of water-vapor in a room, and therefore indirectly indicates the relative amount of carbon dioxid in the room. My device does not directly measure the amount of carbon dioxid in the air of the room, but indirectly indicates it through the amount of water-vapor in the room, and by providing the device with a scale it becomes for all practical purposes a carbonometer. So far as I am aware no device has yet been made for directly measuring the amount of carbon dioxid in the air of a room; but in default of a more accurate term I have chosen to call my device a "carbonometer," as that explains its virtual function, although not its direct mode of operation.

With the above-stated end in view my invention consists of a carbonometer comprising an ordinary thermometer with its scale and a wet-bulb thermometer with two empirical scales constructed from data secured from the observation of the height of the liquids in the two thermometers under all of the conditions of good and bad ventilation likely to occur in the use of a closed artificially-heated occupied room.

In carrying out my invention as herein shown I employ a frame or plate 2, to which I secure in the usual manner an ordinary thermometer 3, which indicates the temperature of the room. This may be a mercury or a spirit thermometer. The scale adopted for the device may be either Fahrenheit, centigrade, or any other. The scale adopted for the device chosen for illustration is Fahrenheit, and therefore the thermometer 3 is graduated on that scale. Upon the same plate 2 I locate a wet-bulb thermometer comprising a bottle or other water-containing vessel 4, in which is immersed a wick 5 of some fibrous material. This wick is extended upward through the neck of the bottle and wrapped around a bulb 6, formed at the lower end of a closed tube 7, the bulb and tube being partially filled with mercury or spirit or any other liquid used in thermometers. On either side of this tube I locate empirical scales heretofore unknown and respectively designated by me as "Bad" and "Good." These terms are employed to indicate that in conjunction with the height of the liquid in the tube 7 they indicate whether or not the air in the room containing the carbonometer is fit or unfit for breathing. These scales are derived from a series of careful observations of the air contained in an artificially-heated room during the whole range of conditions likely to exist in any ordinary or even extraordinary use of an artificially-heated room occupied by a small or large number of people. The scale marked "Good" I construct from data secured by observing the height of the liquid in the thermometers when the room is perfectly or satisfactorily ventilated, but at different temperatures. On the other hand, I construct the scale marked "Bad" by observing the height of the liquid in the two thermometers when the air of the room is so charged with carbon dioxid that it is unwholesome and poisonous, but with the room at correspondingly varying temperatures. For instance, in securing data for the construction of the scale marked "Good" I observed the height of the liquid in the wet-bulb thermometer when the liquid in the ordinary thermometer stood at 70° Fahrenheit in a perfectly or satisfactorily ventilated room. I then figured or marked the height of the liquid in the wet-bulb thermometer as "70" to correspond to the temperature indicated by the ordinary thermometer at the time of the experiment. In a strict sense this use of the number "70" in a scale is arbitrary; but it easily and immediately correlates the action of the two thermometers in adapting them to answer the purposes of the invention. In this manner I conducted a series of similar independent experiments with the room perfectly or satisfactorily ventilated, but through the entire range of different temperatures likely to exist in any use of it. I thus built up step by step the scale marked "Good." Having constructed that scale I conducted a corresponding series of similar independent experiments, but with the air of the room charged by the breath of several persons to an unwholesome degree with carbon dioxid and at different temperatures covering the range of temperatures at which the room was likely to be used. Thus with the room badly ventilated and at a temperature of 70° Fahrenheit I observed and figured at "70" the height of the liquid in the wet-bulb thermometer, and so on, until I had constructed the scale marked "Bad" for use in conjunction with the scale marked "Good," the two scales being constructed in precisely the same way, with the single exception that the observations for one series of experiments were made with the room well ventilated and the observations for the other series of experiments with the room badly ventilated.

It will be observed by reference to the drawings that the number "70" on the scale marked "Good" and the number "70" on the scale marked "Bad" are separated by considerable vertical space. These divisions or points in my scales called "Good" and "Bad" cannot perhaps with propriety be called "degrees" without confusion, as the term "degree" has acquired a technical meaning as marking gradations of temperature, whereas the differentiations of my improved scale though obtained by careful experiments are empirical and may be said to be yet unnamed.

Having thus described the construction of my scales marked "Good" and "Bad," the use of my device will be very readily understood. Suppose, for instance, a class-room to be occupied. The professor observes the ordinary thermometer and finds that it shows the temperature of the room to be 70° Fahrenheit. That, however, gives him no information as to the amount of carbon dioxid in the air of the room. Of that factor he is entirely unconscious, except so far as it may affect his personal comfort, and that would not ordinarily be affected to a degree which would call his attention to the unwholesome condition of the air of the room until the condition thereof was very bad and poisonous; but having ascertained the temperature of the room to be 70° Fahrenheit he can readily ascertain the amount of water-vapor, and hence the amount of carbon dioxid, in the room by consulting the height of the liquid in the wet-bulb thermometer. If the height of the liquid in that thermometer stands at "70" in the scale marked "Good," he knows for a certainty that there is so little carbon-dioxid and water-vapor in the air of the room that the ventilation thereof is satisfactory. On the other hand, if he should observe that the height of the liquid in the wet-bulb thermometer stands at "70" in the scale marked "Bad" he is informed to a certainty that carbon dioxid is present in the room in such excessive quantity as to make the air unwholesome and poisonous and so as to require the immediate ventilation of the room. In this way by means of my improved device any room may at all times be kept not merely at the right temperature, but under proper conditions of ventilation as to carbon dioxid. My improved device will be practically operative only in an artificially-heated occupied room, and will therefore be useful only throughout the seasons of the year when some sort of artificial heat is required, and this is really all that practical conditions call for, for at other seasons of the year when artificial heat is not required and the windows and doors are left open the air in the room is replaced so rapidly that unwholesome and poisonous quantities of carbon dioxid cannot accumulate. At such times also the excess of water-vapor in the air might easily be so great as to prevent the satisfactory operation of the device for the reason that its empirical scales marked "Good" and "Bad" are constructed from data secured by experiments conducted in an artificially-heated room and without taking into account the amount of water-vapor in the outside air. Furthermore, it would be impossible, so far as I can now see, to secure data for the construction of scales corresponding to my so-called "Good" and "Bad" scales by taking a series of observations in a room not artificially heated for the reason that the amount of water-vapor required to saturate the air varies from day to day to a marked degree. The amount of water-vapor required to saturate the air in a closed room varies with the temperature thereof, and that fact lies in the last analysis of the matter at the foundation of my scales, which are prepared from data secured from observation in an artificially-heated room, which being artificially heated may have its temperature changed to take advantage of the fact that the amount of water-vapor required to saturate air varies with the temperature thereof. The principle of my improved device may be further illustrated by calling attention to the fact that it cannot be used to any advantage, at least in a room not artificially heated, for the reason that at ordinary atmospheric temperatures the air might be so nearly saturated with water-vapor that the additional amount of water-vapor that must be breathed into it to bring it to the point of saturation would be very small, and therefore of very little effect upon the action of the wet-bulb thermometer, which is based upon the principle of evaporation from it of moisture into the surrounding air, which if it is saturated or nearly saturated will not effect the evaporation of the liquid supplied to the tube of the wet-bulb thermometer. On the other hand, if the temperature of a room has been raised by artificial heat it is certain that the contained air will be very far from the point of being saturated with water-vapor, so that the amount of water-vapor which must be supplied to the air of the room to saturate it by the breath of its occupants will be relatively large, which gives an active and wide range of operation for the wet-bulb thermometer.

My primary object is not to measure the amount of water-vapor in the air, as that in itself, though uncomfortable, is not deleterious; but my primary object is to ascertain the amount of carbon dioxid in the air, which is poisonous, and in effecting that latter indication I have taken advantage, as already stated, of the observed fact that the air expelled from the lungs of persons is charged in certain practically invariable proportions with water-vapor and carbon dioxid.

It is apparent that in carrying out my invention some changes from the construction shown and described may be made, and I would therefore have it understood that I do not limit myself to a device constructed exactly as illustrated nor to the employment of scales marked "Bad" and "Good" when made up exactly as shown. For instance, they may be varied to a greater or less degree as to range and all of the scales may be transposed from a system following the Fahrenheit scale to a system following centigrade measurements or to any other system. I do not, however, claim to have been the first to observe that air expelled from the lungs in exhalation contains practically fixed proportions of carbon dioxid and water-vapor, with which latter it is filled to the point of saturation, nor to have been the first to provide a thermometer with more than one scale. I do not, therefore, claim either of those points broadly, but only an instrument in which a wet-bulb thermometer is provided with two entirely novel empirical scales originally derived by me from a series of observations, the character of which I have fully described herein.

Having fully described my invention, what I claim is—

A carbonometer comprising an ordinary thermometer with its scale, and a wet-bulb thermometer having two scales one graduated with the instrument in a well-ventilated, occupied and artificially-heated room under changing temperature, by noting the registration of the wet-bulb thermometer for each point at which the liquid in the dry-bulb thermometer registers with a mark on its scale, and the other, in the same manner, but with the instrument in a badly-ventilated, occupied and artificially-heated room, each scale being suitably characterized and numbered.

In testimony whereof I have signed this specification in the presence of two subscribing witnesses.

EDGAR S. DOWNS.

Witnesses:
FRED. C. EARLE,
LILLIAN D. KELSEY.